United States Patent
Drescher et al.

(10) Patent No.: US 7,577,818 B2
(45) Date of Patent: Aug. 18, 2009

(54) MICROPROCESSOR PROGRAM ADDRESSING ARRANGEMENT HAVING MULTIPLE INDEPENDENT COMPLETE ADDRESS GENERATORS

(75) Inventors: Wolfram Drescher, Dresden (DE); Uwe Porst, Dresden (DE)

(73) Assignee: NXP B.V., Eindhoven (NL)

( * ) Notice: Subject to any disclaimer, the term of this patent is extended or adjusted under 35 U.S.C. 154(b) by 641 days.

(21) Appl. No.: 10/139,733

(22) Filed: May 6, 2002

(65) Prior Publication Data
US 2002/0169939 A1 Nov. 14, 2002

(30) Foreign Application Priority Data
May 8, 2001 (DE) .................. 101 22 309

(51) Int. Cl.
*G06F 9/30* (2006.01)
(52) U.S. Cl. .................. 711/211; 711/214; 711/219
(58) Field of Classification Search ......... 711/211–213, 711/2, 214, 218; 708/706, 709
See application file for complete search history.

(56) References Cited
U.S. PATENT DOCUMENTS

| | | | | |
|---|---|---|---|---|
| 4,306,287 A | * | 12/1981 | Huang | 711/217 |
| 4,349,888 A | * | 9/1982 | Smith | 708/230 |
| 4,926,317 A | * | 5/1990 | Wallach et al. | 711/3 |
| 5,203,006 A | * | 4/1993 | Taniai | 711/213 |
| 5,450,566 A | * | 9/1995 | Yoshida et al. | 711/150 |
| 5,588,133 A | * | 12/1996 | Yoshida et al. | 711/150 |
| 5,740,377 A | * | 4/1998 | Sonobe | 710/301 |
| 5,983,338 A | * | 11/1999 | Moyer et al. | 712/34 |
| 6,029,241 A | * | 2/2000 | Wojewoda et al. | 712/38 |
| 6,079,002 A | * | 6/2000 | Thatcher et al. | 711/169 |
| 6,564,283 B1 | * | 5/2003 | Ahn | 711/2 |
| 2003/0206173 A1 | * | 11/2003 | Kawai et al. | 345/558 |

FOREIGN PATENT DOCUMENTS

DE 4009382 9/1991

* cited by examiner

*Primary Examiner*—Hetul Patel

(57) ABSTRACT

An address-generating arrangement for a microprocessor has, in addition to its base address-generating unit, one or more address-generating expansion units, connected to the basic unity by an interface. The interface comprises one or more input data buses supplying data from the base unit to the expansion unit and an output data bus supplying data from the expansion unit to the basic unit under control of the microprocessor.

Figure 1:
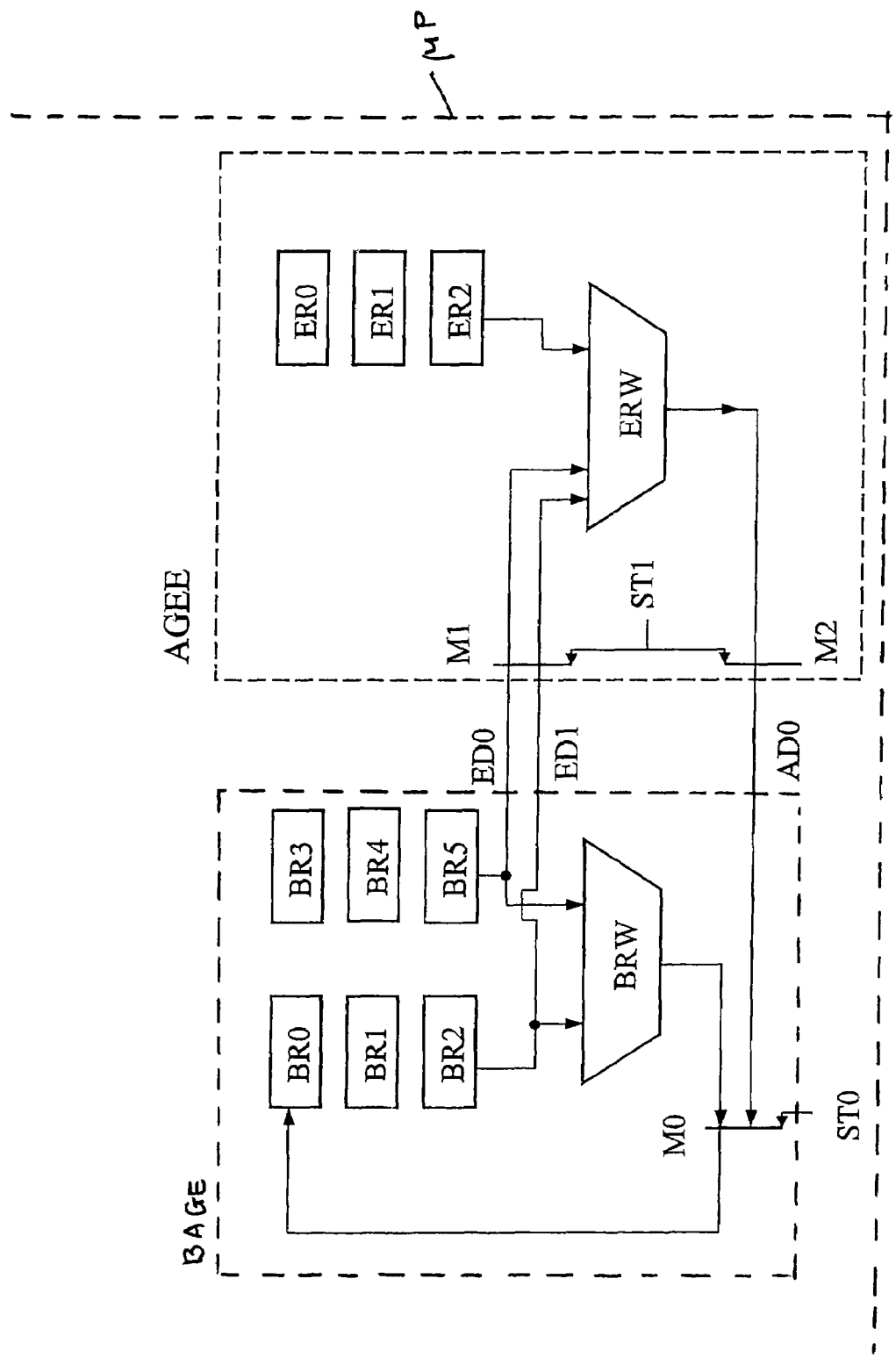

9 Claims, 2 Drawing Sheets

MICROPROCESSOR PROGRAM ADDRESSING ARRANGEMENT HAVING MULTIPLE INDEPENDENT COMPLETE ADDRESS GENERATORS

FIELD OF THE INVENTION

The invention relates to an address-generating arrangement for a microprocessor for increasing the functionality of the unit.

BACKGROUND OF THE INVENTION

The control unit, the arithmetic unit, the register unit, the address-generating unit and the bus interface are essential components of a digital signal processor. The control unit establishes the sequence in which instructions are read out of the program memory, monitors the connections to peripheral devices and controls the register unit, the arithmetic unit and the address-generating unit. In the address-generating unit, the required addresses, with the aid of which the data memory is read or described, are computed in a special address arithmetic unit. In this unit, valid addresses in the contents of registers are determined by means of arithmetic and logic operations. Depending on the specific structure of the processor and of the memory responding to it, highly variable computation methods are required in the address arithmetic unit. In multitasking processors, the address-generating unit also manages protected data areas and checks access authorization.

In order to be able to provide a high degree of flexibility with regard to memory access, a multitude of addressing modes is frequently implemented by providing a plurality of address arithmetic units for obtaining minimum access time. This entails a high circuit cost, expenditure, and in addition, requires run times that under some circumstances stand in the way of rapid program extension.

On the other hand, a multitude of addressing modes with only one address arithmetic unit in the address-generating unit often can be realized only by complicated and hence time-consuming computations, which under some circumstances must be performed outside the address-generating unit.

SUMMARY OF THE INVENTION

The object of the invention thus is to make available an address-generating arrangement which, when required, can carry out any desired address computations and which is optimized with regard to run times.

In accordance with the invention, to be able to deal flexibly with the respective requirements in address computations, the base address-generating unit has an interface that makes available an output data bus and an input data bus over which data that can be used for generation of the respective addresses may be routed, to increase the functionality of the base address generating unit.

The invention is premised on the fact that in specific applications, often only a small part of the addressing possibilities normally implemented in a processor is fully utilized. Accordingly, optimization is achieved in that a base functionality of the address-generating unit is made available by a suitably designed base arithmetic unit, and the additional functionality required for a specific application by the connection of an additional circuit arrangement via an interface of the address-generating unit. This interface may comprise at least one output data bus and at least one input data bus, via which information required for generation may be routed.

In order to make available the additional functionality in address computation required for the specific task set, an address-generating expansion unit is connectable, via the interface, to the base register and/or the base arithmetic unit of the base address-generating unit. At the same time, the address-generating expansion unit may have at least one additional register and one additional arithmetic unit, which are available for expanded address computation. Data in the base registers, as well as output data of the base arithmetic unit, may be supplied to the address-generating expansion unit. Alternatively, output data of the expansion arithmetic unit may be supplied to the base arithmetic unit via the interface.

Further, output and input data buses may be combined by the provision of an internal bus in the address-generating unit, simplifying the connection of a plurality of address-generating expansion units, which may be added as required. For this purpose, it may be provided that the interface is controllable by, for example, the control unit of the processor. It is thus possible to optimize address generation with regard to execution of a given program, since an address-generating expansion unit adapted to the requirement is connectable.

In order to make access to data in the base registers available within the address-generating expansion unit, it may additionally be provided that the base registers are connected with the at least one expansion register.

BRIEF DESCRIPTION OF THE INVENTION

Figure 2:
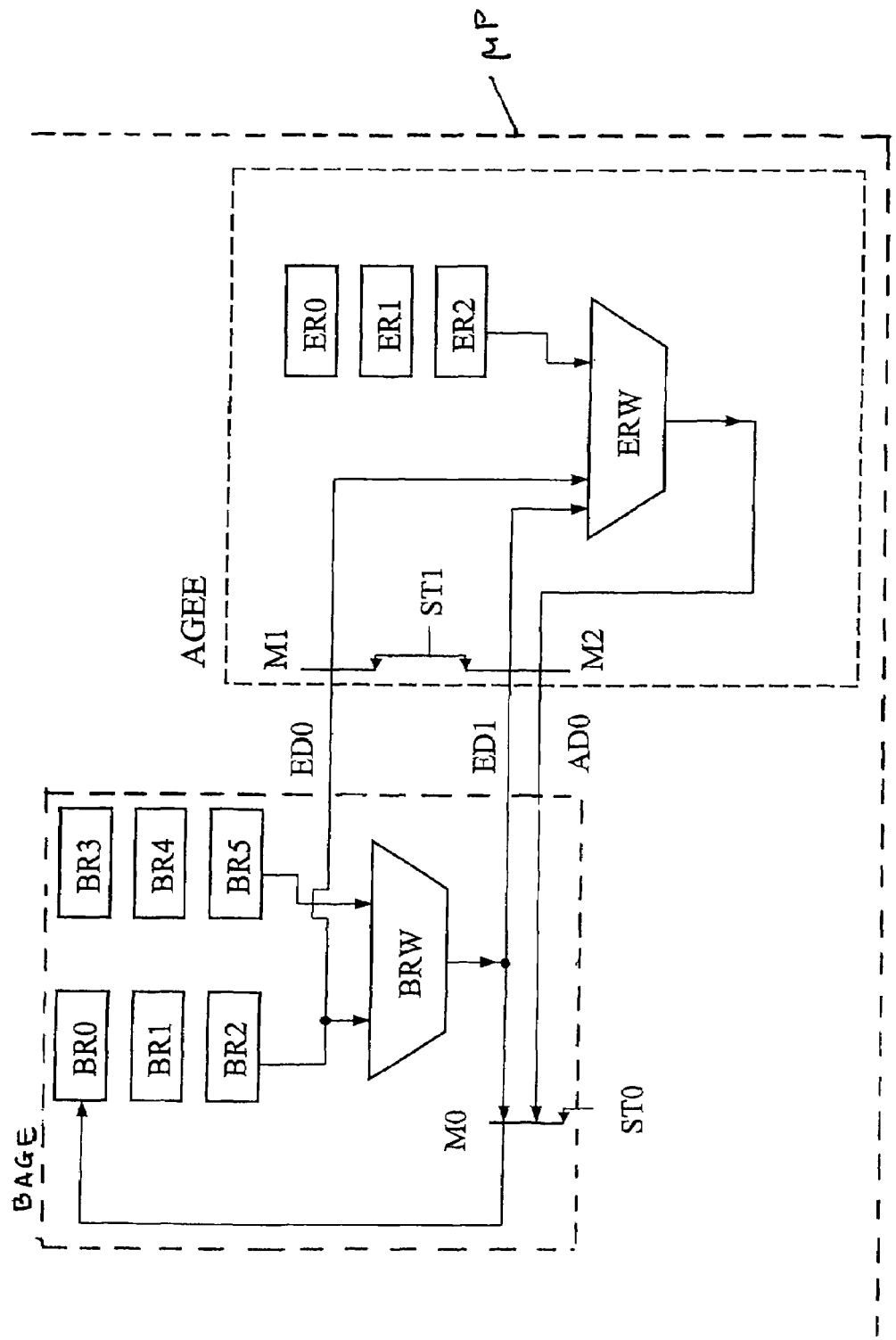

The invention is explained by the following detailed description of thereof, taken in conjunction with the accompanying drawing, in which FIG. 1 illustrates in block diagram a first embodiment of the invention and FIG. 2 illustrates in block diagram a second embodiment of the invention.

DETAILED DESCRIPTION OF THE INVENTION

The base address-generating unit represented in FIG. 1 includes six base registers BR0 to BR5 and one allocated base arithmetic unit BRW, for making available the basic functionality. There each base register may be selected for computation, the result being written back into one of the six registers. The base arithmetic unit is designed for forming the sum of the register contents BR2 and BR5, while the result is written in the register BR0.

An address-generating expansion unit AGEE is connected to the base address generating unit via two input data buses ED0, ED1, and one output data bus AD0. The address-generating expansion unit comprises an additional three registers ER0, ER1 and ER2, as well as an additional expansion arithmetic unit ERW. At the same time, the two input data buses ED0 and ED1 connect the base registers BR2 and BR5 with two inputs of the expansion arithmetic unit ERW, in which a bit-reverse function is executed. The third input of the expansion arithmetic unit is connected with the register ER2, which applies a constant, designated as displacement, to the result of the bit-reverse function. The address-generating expansion unit AGEE is enabled by a control signal ST1. The result of the expansion arithmetic unit, together with the result of the base arithmetic unit, is sent to a multiplexer M0, wherein the computed addresses to be written into the register BR0 may be selected via the control signal ST0.

Another internal circuit arrangement of the components of the address-generating arrangement is shown in FIG. 2. Two input data buses ED0, ED1 and one output data bus AD0, which connect specific components of the address-generating expansion unit to the base components, are again actuated via multiplexers M1 and M2 by the control signal ST1. The base register BR2 is connected via the input data bus ED0 with an input of the expansion arithmetic unit ERW, and the output of the base arithmetic unit BRW is connected via the input data bus ED1 with a second input of the expansion arithmetic unit ERW. The output of expansion register ER2 is applied at the third input of the expansion arithmetic unit. Addition of the register values BR2 and ER2 is performed in the expansion arithmetic unit and the result of the base arithmetic unit BRW is shifted toward the left by the number of places determined.

At the multiplexer M0, the control signals STO selects whether the result of the base arithmetic unit or of the expansion arithmetic unit is written into the base register BR0.

The combination of basic functionality provided by base arithmetic unit BRW and the address generator expansion units provided for increased flexibility in address generation over the basic functionality and provides rapid program expansion.

While there have been described what are believed to be the preferred embodiments of the invention those skilled in the art will recognize that other changes and modifications may be made thereto without departing from the spirit of the invention, and it is intended to claim all such changes and modifications as fall within the true scope of the invention.

We claim:

1. An address-generating arrangement for a microprocessor comprising:
 a base address-generating unit including a plurality of base registers and at least one base arithmetic unit having an address output, said address output including a first address, wherein said first address is a complete address having width equal to the width of an address register useable in program execution;
 an address-generating expansion unit having an address bus output, said address bus output including a second address that includes an address extension, wherein said second address is another complete address having width equal to the width of the address register useable in program execution; and
 an interface for selectively connecting one of said address output and said address bus output to one of said plurality of base registers in said base address-generating unit, wherein said base address-generating unit and said address-generating expansion unit are configured to substantially independently generate complete addresses namely said first and second addressees useable in microprocessor program execution, respectively.

2. The address-generating arrangement of claim 1 wherein said address-generating expansion unit comprises at least one expansion register and an expansion arithmetic unit.

3. The address-generating arrangement of claim 2 wherein said interface comprises one or more input data buses for supplying data from said base address-generating unit to said address-generating expansion unit and an output data bus for supplying data from said address-generating expansion unit to said base address-generating unit.

4. The address-generating arrangement of claim 3 wherein one of said input data buses supplies data from one of said base registers to said expansion arithmetic unit and said output data bus supplies data from said expansion arithmetic unit to one of said base registers.

5. The address-generating arrangement of claim 3 wherein said input data buses include an input data bus for supplying data from one of said base registers and an input data bus for supplying output data from said base arithmetic unit.

6. The address-generating arrangement of claim 3 further arranged to provide output data from one of said base arithmetic unit and said expansion arithmetic unit to a base register.

7. The address-generating arrangement of claim 3 wherein said input and output data buses are provided as internal buses in said base address-generating expansion unit.

8. The address-generating arrangement of claim 3, further comprising a multiplexer, said output data bus supplying data from said expansion arithmetic unit to a base register via said multiplexer.

9. The address-generating arrangement of claim 1 wherein said interface is controlled by said microprocessor.

* * * * *